(12) United States Patent
Yamada et al.

(10) Patent No.: US 10,502,120 B2
(45) Date of Patent: Dec. 10, 2019

(54) UNIFLOW-SCAVENGED TWO-CYCLE ENGINE

(71) Applicant: IHI Corporation, Tokyo (JP)

(72) Inventors: Takeshi Yamada, Tokyo (JP);
Takayuki Hirose, Yokohama (JP);
Yoshiyuki Umemoto, Tatsuno (JP)

(73) Assignee: IHI CORPORATION, Tokyo (JP)

( * ) Notice: Subject to any disclaimer, the term of this patent is extended or adjusted under 35 U.S.C. 154(b) by 195 days.

(21) Appl. No.: 15/474,556

(22) Filed: Mar. 30, 2017

(65) Prior Publication Data

US 2017/0204778 A1 Jul. 20, 2017

Related U.S. Application Data

(63) Continuation of application No. PCT/JP2015/080926, filed on Nov. 2, 2015.

(30) Foreign Application Priority Data

Nov. 4, 2014 (JP) .................................. 2014-224454

(51) Int. Cl.
*F02B 25/04* (2006.01)
*F02D 19/06* (2006.01)
(Continued)

(52) U.S. Cl.
CPC .............. *F02B 25/04* (2013.01); *F02B 43/00* (2013.01); *F02D 19/025* (2013.01);
(Continued)

(58) Field of Classification Search
CPC .......... F02D 2041/225; F02D 19/0663; F02D 19/0697; F02B 77/10; F02B 2710/03–038; F02M 69/10
See application file for complete search history.

(56) References Cited

U.S. PATENT DOCUMENTS

| 6,145,483 A | 11/2000 | Asai |
| 2014/0238350 A1 | 8/2014 | Fiveland et al. |
| 2015/0167537 A1 | 6/2015 | Masuda et al. |

FOREIGN PATENT DOCUMENTS

| CN | 1200432 A | 12/1998 |
| DE | 10 2011 003 909 A1 | 8/2012 |

(Continued)

*Primary Examiner* — Hung Q Nguyen
*Assistant Examiner* — Mark L. Greene
(74) *Attorney, Agent, or Firm* — Rothwell, Figg, Ernst & Manbeck, P.C.

(57) ABSTRACT

A uniflow-scavenged two-cycle engine includes: a cylinder which has a combustion chamber; a piston; a scavenging chamber that surrounds one end side of the cylinder in the stroke direction of the piston and to which compressed active gas is guided; a scavenging port that is provided in a portion of the cylinder which is positioned in the scavenging chamber and suctions active gas from the scavenging chamber to the combustion chamber in response to a sliding motion of the piston; a fuel injection opening that injects fuel gas into the active gas which is suctioned into the scavenging port; and a fuel injecting valve that opens and closes a fuel supply path through which a fuel tank, communicates with the fuel injection opening, and is disposed in an space isolated from the scavenging chamber.

3 Claims, 3 Drawing Sheets

(51) Int. Cl.
  *F02B 43/00* (2006.01)
  *F02D 41/22* (2006.01)
  *F02D 19/02* (2006.01)
  *F02D 41/00* (2006.01)

(52) U.S. Cl.
  CPC ....... *F02D 19/029* (2013.01); *F02D 19/0697* (2013.01); *F02D 41/22* (2013.01); *F02B 2201/064* (2013.01); *F02B 2710/03* (2013.01); *F02D 41/0027* (2013.01); *F02D 2041/225* (2013.01); *F02D 2400/04* (2013.01); *Y02T 10/32* (2013.01); *Y02T 10/40* (2013.01)

(56) References Cited

FOREIGN PATENT DOCUMENTS

| | | | |
|---|---|---|---|
| EP | 2 949 901 A1 | 12/2015 | |
| JP | 62-082355 U | 5/1987 | |
| JP | 7-224741 A | 8/1995 | |
| JP | 2005-214090 A | 8/2005 | |
| JP | 2007-332800 A | 12/2007 | |
| JP | 2012-154189 A | 8/2012 | |
| JP | 2013-007320 A | 1/2013 | |
| JP | 2014-5818 A | 1/2014 | |
| JP | 2014-047707 A | 3/2014 | |
| WO | WO-2014076367 A1 * | 5/2014 | ......... F02M 21/0245 |
| WO | 2014/115572 A1 | 7/2014 | |

* cited by examiner

UNIFLOW-SCAVENGED TWO-CYCLE ENGINE

CROSS-REFERENCE TO RELATED APPLICATIONS

This application is a continuation application based on a PCT Patent Application No. PCT/JP2015/080926, filed Nov. 2, 2015, whose priority is claimed on Japanese Patent Application No. 2014-224454, filed on Nov. 4, 2014. The contents of both the PCT Application and the Japanese Applications are incorporated herein by reference.

TECHNICAL FIELD

The present disclosure relates to a uniflow-scavenged two-cycle engine in which a fuel gas is supplied into a cylinder when a fuel injecting valve is opened.

BACKGROUND ART

A uniflow-scavenged two-cycle engine that is also used as an engine in a ship is provided with a scavenging port in one end portion side and an exhaust port on the other end portion side of a piston in a stroke direction in a cylinder. When active gas is suctioned from the scavenging port to a combustion chamber in an intake (feeding) stroke, exhaust gas produced in combustion behavior is pushed and is exhausted from the exhaust port with the suctioned active gas.

For example, Patent Document 1 discloses an engine that includes a cylinder to which a fuel injecting valve is attached and fuel gas is supplied into the cylinder from the fuel injecting valve. In addition, a configuration, in which the cylinder is provided with the fuel injecting valve on an outer side thereof and the fuel gas is provided into the cylinder from a scavenging port, is considered. When the fuel injecting valve is opened and the fuel gas is supplied into the cylinder, the fuel gas and active gas are compressed through a compression stroke and the fuel gas ignites and combusts in the combustion chamber. A piston reciprocates in the cylinder due to explosion pressure produced by an effect of the combustion.

CITATION LIST

Patent Document

[Patent Document 1] Japanese Unexamined Patent Application, First Publication No. 2013-7320

SUMMARY

Incidentally, the fuel injecting valve is disposed in a scavenging chamber which is filled with the compressed active gas, or in a space communicating with the scavenging chamber. Therefore, when the fuel gas leaks from the fuel injecting valve at the time of stop of the engine, the fuel gas is likely to flow into the compressed active gas.

In consideration of such a problem, an object of the present disclosure is to provide a uniflow-scavenged two-cycle engine in which it is possible to avoid leaking of fuel gas into compressed active gas.

In order to solve a problem described above, according to a first aspect of the present disclosure, there is provided a uniflow-scavenged two-cycle engine including: a cylinder in which a combustion chamber is formed; a piston that slides in the cylinder; a scavenging chamber which surrounds one end side of the cylinder in the stroke direction of the piston and to which compressed active gas is guided; a scavenging port that is provided in a portion of the cylinder, which is positioned in the scavenging chamber and suctions active gas from the scavenging chamber to the combustion chamber in response to a sliding motion of the piston; a fuel injection opening that is provided on an outer side of the cylinder in a radial direction thereof from the scavenging port and injects fuel gas into the active gas which is suctioned into the scavenging port; and a fuel injecting valve that opens and closes a fuel supply path through which a fuel tank, in which the fuel gas is stored, communicates with the fuel injection opening. In addition, the fuel injecting valve is disposed in an isolated space isolated from the scavenging chamber.

According to the uniflow-scavenged two-cycle engine of the present disclosure, it is possible to avoid leaking of fuel gas into compressed active gas.

DESCRIPTION OF EMBODIMENTS

Hereinafter, a preferred embodiment according to the present disclosure will be described with reference to the accompanying figures. The dimensions, the materials, the specific numbers other than the dimensions and the materials, or the like is provided only as an example for easy understanding of disclosed content, and the disclosure is not limited thereto except for a case where particular description is provided. Note that, in the present specification and the figures, an element having substantially the same function and configuration is assigned with the same reference sign and repeated description thereof is omitted, and illustration of an element without a direct relationship with the present disclosure is omitted in the figures.

Figure 1:
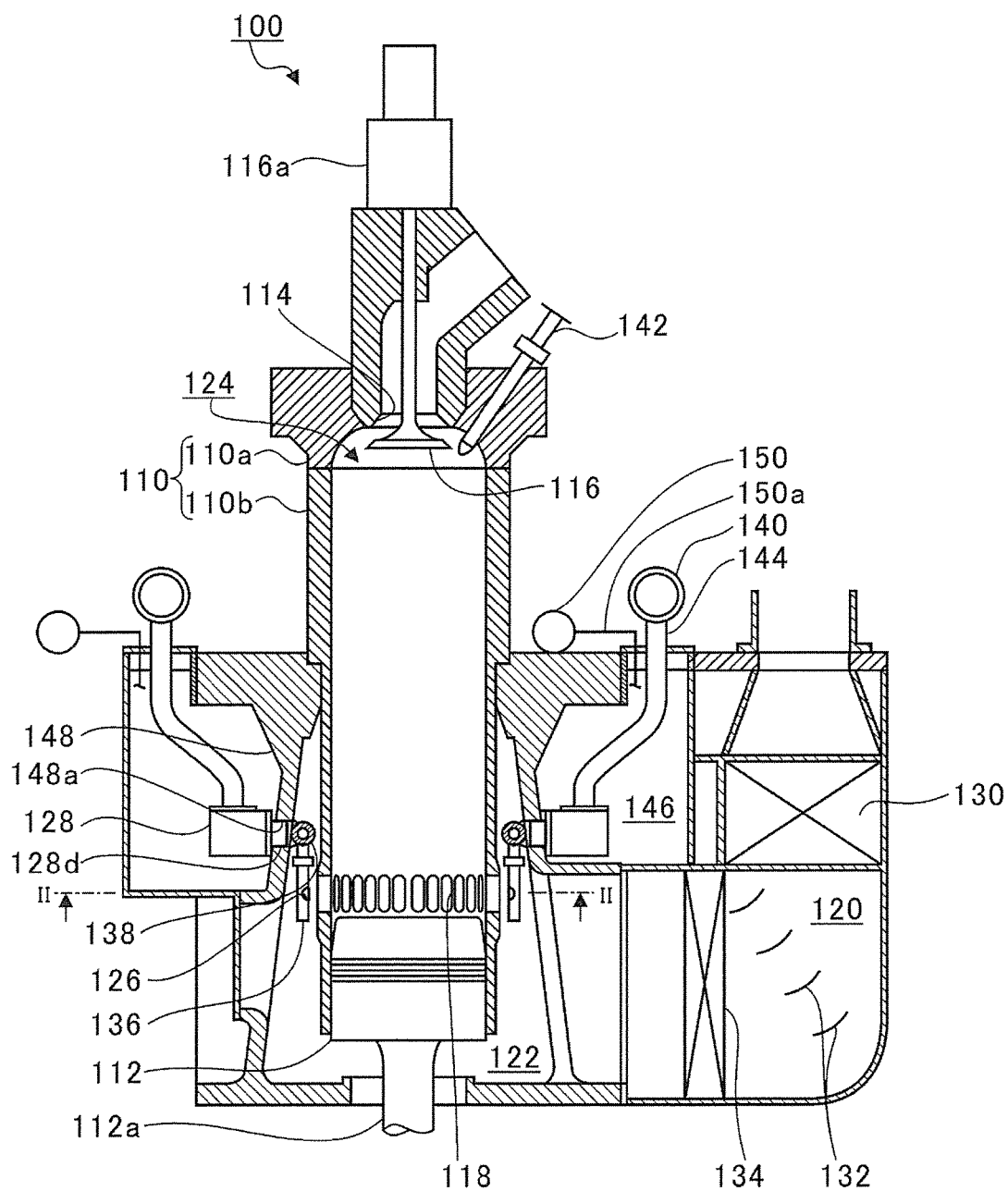
FIG. 1 is a diagram showing an entire configuration of a uniflow-scavenged two-cycle engine.

FIG. 1 is a view showing an entire configuration of a uniflow-scavenged two-cycle engine 100. The uniflow-scavenged two-cycle engine 100 of the embodiment is used in a ship or the like. Specifically, the uniflow-scavenged two-cycle engine 100 is configured to include a cylinder 110, a piston 112, an exhaust port 114, an exhaust valve 116, a scavenging port 118, a scavenging reservoir 120, a scavenging chamber 122, a combustion chamber 124, a fuel injection opening 126, and a fuel injecting valve 128.

In the uniflow-scavenged two-cycle engine 100, exhaust, intake, compression, and combustion are performed during two strokes of an ascending stroke and a descending stroke of the piston 112 and the piston 112 slides in the cylinder 110. One end of a piston rod 112a is fixed to the piston 112. In addition, a crosshead (not shown) is connected to the other end of the piston rod 112a, and the crosshead reciprocates along with the piston 112. When the crosshead reciprocates in response to the reciprocating of the piston 112, a crankshaft (not shown) rotates by interlocking with the reciprocating crosshead.

The exhaust port 114 is an opening provided in a cylinder head 110a positioned above the top dead center of the piston 112, and is opened and closed to discharge exhaust gas produced after combustion in the cylinder 110. The exhaust valve 116 slides vertically at a predetermined timing by an exhaust valve driving device 116a and opens and closes the exhaust port 114. When the exhaust port 114 is opened, exhaust gas is discharged from the cylinder 110 via the exhaust port 114.

The scavenging port 118 is a hole penetrating from an inner circumferential surface (inner circumferential surface of a cylinder liner 110b) to an outer circumferential surface of the cylinder 110 on the lower end side, and a plurality of scavenging ports are provided all around the cylinder 110. The scavenging ports 118 suction active gas into the cylinder 110 in response to a sliding motion of the piston 112. The active gas contains an oxidizing agent such as oxygen or ozone, or a mixture thereof (for example, air).

The active gas (for example, air) compressed by a blower (not shown) is cooled by the cooler 130 and is sealed in the scavenging reservoir 120. The compressed and cooled active gas is rectified by a current plate 132 disposed in the scavenging reservoir 120, and then moisture is removed by a drain separator 134.

The scavenging chamber 122 communicates with the scavenging reservoir 120 and surrounds one end side (lower side in FIG. 1) of the cylinder 110 in the stroke direction of the piston 112, and active gas subjected to compression, cooling, and removal of moisture is guided to the scavenging chamber.

The scavenging port 118 is provided in a portion of the cylinder 110 (cylinder liner 110b), which is positioned in the scavenging chamber 122, and suctions active gas from the scavenging chamber 122 into the cylinder 110 due to the differential pressure between the scavenging chamber 122 and the cylinder 110 in response to the sliding motion of the piston 112. The active gas suctioned in the cylinder 110 is guided by the piston 112 to the combustion chamber 124.

Figure 2:
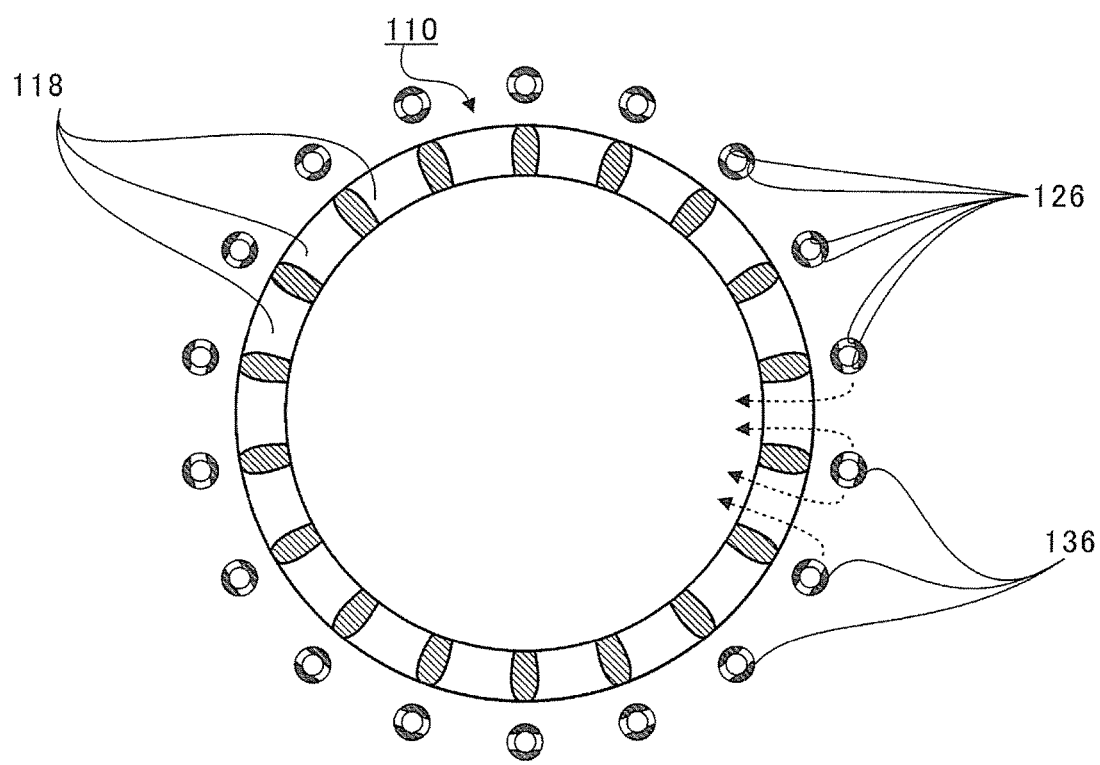
FIG. 2 is a sectional view taken along line II-II in FIG. 1 showing a fuel injection opening.

FIG. 2 is a sectional view taken along line II-II in FIG. 1 showing a fuel injection opening 126. As shown in FIG. 2, the fuel injection opening 126 is provided on an outer side of the cylinder 110 in a radial direction from the scavenging port 118. Specifically, the fuel injection opening 126 is provided between adjacent scavenging ports 118 so as to face an outer surface of the cylinder 110. In addition, the fuel injection opening 126 is positioned in a forming range of the scavenging port 118 in the stroke direction of the piston 112.

In the embodiment, a plurality of scavenging ports 118 are provided all around the uniflow-scavenged two-cycle engine 100, and a plurality of fuel injection openings 126 are provided in a circumferential direction of the cylinder 110 in proportion to the scavenging ports 118. Specifically, fuel pipes 136, which guide the fuel gas to the several scavenging ports 118, extend in the stroke direction of the piston 112. In the structure, the fuel pipe 136 is disposed on the outer side of the outer surface of the cylinder 110 in the radial direction between adjacent scavenging ports 118, and thus the fuel pipe 136 is unlikely to interfere with flowing of the active gas. In addition, the fuel injection opening 126 is an opening formed on a side surface of a fuel pipe 136 toward another adjacent fuel pipe 136 side.

The fuel pipe 136 is provided with an annular pipe 138 on the exhaust port 114 side (upper side in FIG. 1). The annular pipe 138 is a pipe having an annular shape in the circumferential direction of the cylinder 110. The annular pipe 138 surrounding the outer side of the cylinder 110 in the radial direction, and communicates with the fuel pipe 136. The fuel gas is guided to the annular pipe 138 from a fuel tank 140 in which the fuel gas is stored.

The fuel injection opening 126 injects the fuel gas supplied from the fuel tank 140 via the annular pipe 138, to the active gas suctioned in the scavenging port 118. As a result, as shown with a dashed arrow in FIG. 2, the fuel gas joins the flow of the active gas, is suctioned with the active gas into the cylinder 110 from the scavenging port 118, and is guided to the combustion chamber 124.

In FIG. 2, the case where the fuel injection opening 126 is formed toward the adjacent fuel pipe 136 side is described; however, the fuel injection opening 126 is not limited thereto, as long as the injected fuel gas is suctioned into the scavenging port 118 together with the active gas, and the fuel injection opening 126 may be provided at any position of the fuel pipe 136 so as to be opened toward the scavenging port 118 side, for example.

In addition, in FIG. 2, the case, where the same number of the fuel pipes 136 and the scavenging ports 118 is disposed, is described; however, the number of the fuel pipes 136 and the scavenging ports 118 may be different from each other, or, for example, two scavenging ports 118 may be provided for each of the fuel pipes 136.

In addition, as shown in FIG. 1, a pilot injection valve 142 is provided in the cylinder head 110a. An appropriate amount of fuel oil is injected from the pilot injection valve 142 at a predetermined time point in an engine cycle. The fuel oil is vaporized into fuel gas with heat in the combustion chamber 124 formed in the cylinder 110 by being surrounded by the cylinder head 110a, the cylinder liner 110b, and the piston 112. The fuel gas obtained by vaporization of the fuel oil spontaneously ignites, combusts in a short time, and the temperature in the combustion chamber 124 rises to be very high. As a result, it is possible to reliably combust the fuel gas guided to the combustion chamber 124 at a predetermined timing. The piston 112 reciprocates due to expansion pressure mainly produced from the combustion of the fuel gas.

Here, the fuel gas is generated, for example, by gasifying liquefied natural gas (LNG). In addition, the fuel gas is not limited to the LNG, and, for example, gas generated by gasifying liquefied petroleum gas (LPG), gas oil, heavy oil, or the like can be applied to the fuel gas.

The fuel injecting valve 128 is provided on the upstream side from the fuel pipe 136 and the annular pipe 138 on the fuel supply path 144 through which the fuel tank 140 communicates with the fuel injection opening 126. Then, the fuel injecting valve 128 opens and closes the fuel supply path 144 and controls injection of the fuel gas from the fuel injection opening 126.

Figure 3:
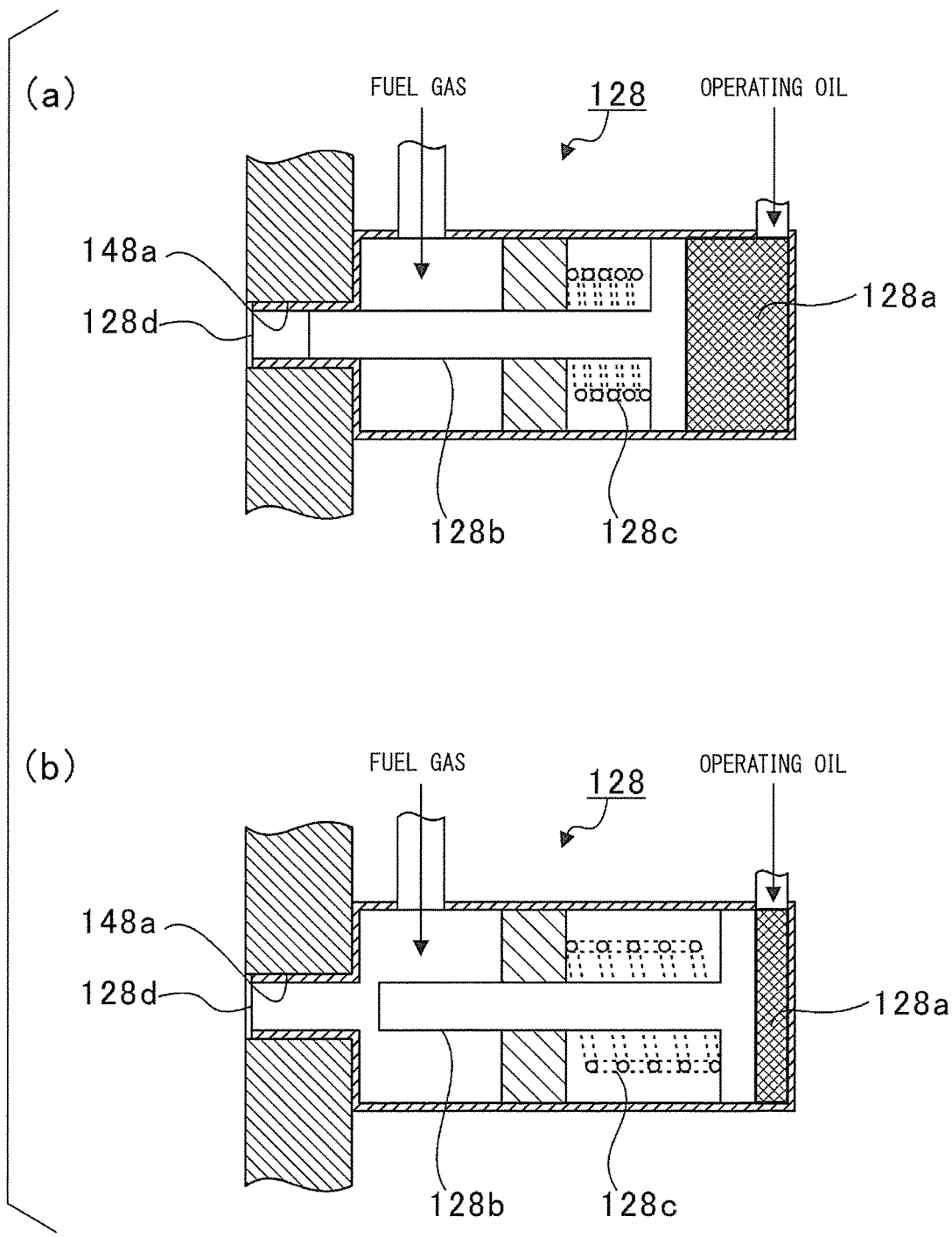
FIG. 3 is a view showing a fuel injecting valve.

FIG. 3 is a schematic sectional view of the fuel injecting valve 128, for showing the fuel injecting valve 128. As shown in FIG. 3, the fuel injecting valve 128 is, for example, a hydraulic on-off valve, and a valve body 128b moves to the left side in FIG. 3 and is closed against a bias force of a spring 128c as shown in (a) in FIG. 3 when operating oil is pressed into a hydraulic chamber 128a. In addition, the operating oil to the hydraulic chamber 128a has a weak pressing force, the valve body 128b moves to the right side in FIG. 3 and is opened with the bias force of the spring 128c as shown in (b) in FIG. 3.

A front end portion 128d of the fuel injecting valve 128 communicates with the annular pipe 138, and thus a flow path from the fuel tank 140 to the fuel injection opening 126 is blocked in the state shown in (a) in FIG. 3. In addition, in the state shown in (b) in FIG. 3, the flow path communicates from the fuel tank 140 to the fuel injection opening 126.

Incidentally, in a case where the fuel injecting valve 128 is disposed at a position at which the fuel injecting valve communicates with the scavenging chamber 122 or the scavenging chamber 122 that is filled with the compressed active gas, the fuel gas is likely to flow into the compressed gas when the fuel gas leaks from the fuel injecting valve 128 at the time of stop of the uniflow-scavenged two-cycle engine 100.

The fuel injecting valve 128 is provided in an isolated space 146 isolated from the scavenging chamber 122 as shown in FIG. 1. In a case in FIG. 1, the isolated space 146 is isolated with a partition wall 148 from the scavenging chamber 122. That is, the isolated space 146 is isolated from the scavenging reservoir 120 which communicates with the scavenging chamber 122. In other words, the isolated space 146 is a space isolated from a space that is filled with the compressed active gas.

In addition, the front end portion 128d of the fuel injecting valve 128 is inserted into a through-hole 148a provided in the partition wall 148, and thus a gap between the through-hole 148a and the front end portion 128d is closed.

Therefore, the compressed active gas, with which the scavenging chamber 122 is filled, little flows in the isolated space 146. Accordingly, it is possible to avoid leaking of the fuel gas into the compressed active gas.

In addition, the isolated space 146 is provided with a gas detecting tube 150a of a gas detecting sensor 150. The gas detecting sensor 150 determines whether or not the fuel gas is contained in gas flowing in from the front end of the gas detecting tube 150a, and detects leaking of the fuel gas. Since the active gas does not flow into the isolated space 146, an amount of gas flow is smaller than that in the scavenging chamber 122. Hence, in a case where the fuel gas leaks into the isolated space 146, it is possible to perform early detection from the gas flow without lowering a concentration of the fuel gas even when there is a small amount of leaking.

In addition, the isolated space 146 has a substantially sealed structure, and thus little external air flows therein. Therefore, in the case where the fuel gas leaks into the isolated space 146, it is possible to perform early detection from the external flow without lowering the concentration of the fuel gas.

As described above, the preferred embodiment of the present disclosure is described with reference to the accompanying figures; however, it is needless to say that the present disclosure is not limited to the embodiment. It is obvious for those skilled in the art to conceive various modification examples or alteration examples within the range of the claims, and thus it is understood that the examples are also included within the technical scope of the present disclosure.

In the example described above, the case where the plurality of scavenging ports 118 and fuel injection openings 126 are provided in the circumferential direction of the cylinder 110; however, at least one scavenging port 118 and fuel injection opening 126 may be provided. In addition, a different number of scavenging ports 118 and fuel injection openings 126, which are disposed in the circumferential direction of the cylinder 110, may be provided.

In addition, in the embodiment described above, the case, where the gas detecting sensor 150 is provided, is described; however, the gas detecting sensor 150 is not essential configuration in the present disclosure.

In addition, in the embodiment described above, the case, where the isolated space 146 has the sealed structure, is described, the isolated space 146 may not have a sealed structure, but external gas may flow in the isolated space 146.

INDUSTRIAL APPLICABILITY

The present disclosure can be used in a uniflow-scavenged two-cycle engine in which a fuel gas is supplied into a cylinder when a fuel injecting valve is opened.

What is claimed is:

1. A uniflow-scavenged two-cycle engine comprising:
    a cylinder in which a combustion chamber is formed;
    a piston that slides in the cylinder;
    a scavenging chamber which surrounds one end side of the cylinder in the stroke direction of the piston and to which compressed active gas is guided;
    a plurality of scavenging ports that are provided in a circumferential direction of the cylinder, are provided in a portion of the cylinder which is positioned in the scavenging chamber, and that suction the active gas from the scavenging chamber to the combustion chamber in response to a sliding motion of the piston;
    a fuel injection opening that is provided on an outer side of the cylinder in a radial direction thereof from the scavenging ports and injects fuel gas into the active gas which is suctioned into the scavenging ports; and
    a fuel injecting valve that opens and closes a fuel supply path through which a fuel tank, in which the fuel gas is stored, communicates with the fuel injection opening,
    wherein the fuel supply path includes a fuel pipe,
    the fuel pipe extends in a stroke direction of the piston and is located in the scavenging chamber,
    the fuel injection opening is formed in the fuel pipe,
    the fuel injecting valve is disposed in an isolated space isolated from the scavenging chamber, and
    the fuel pipe is disposed on the outer side of an outer surface of the cylinder in the radial direction between the scavenging ports which are adjacent to each other.

2. The uniflow-scavenged two-cycle engine according to claim 1, further comprising:
    a gas detecting sensor that is provided in the isolated space and detects leaking of the fuel gas in the isolated space.

3. The uniflow-scavenged two-cycle engine according to claim 2, wherein the isolated space is sealed against external air.

* * * * *